US011828267B2

(12) United States Patent
Lowenhar et al.

(10) Patent No.: US 11,828,267 B2
(45) Date of Patent: *Nov. 28, 2023

(54) WIND TURBINE BLADE MONITORING SYSTEMS

(71) Applicant: Mistras Group, Inc., Princeton, NJ (US)

(72) Inventors: Edward P. Lowenhar, Belle Mead, NJ (US); Tim Bradshaw, Princeton Junction, NJ (US); Phillip Trevor Cole, Cambridge (GB)

(73) Assignee: Mistras Group, Inc., Princeton Junction, NJ (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/518,538

(22) Filed: Nov. 3, 2021

(65) Prior Publication Data

US 2022/0056888 A1    Feb. 24, 2022

Related U.S. Application Data

(63) Continuation of application No. 16/450,892, filed on Jun. 24, 2019, now Pat. No. 11,168,668.

(51) Int. Cl.
*F03D 17/00* (2016.01)
*G01N 29/14* (2006.01)

(52) U.S. Cl.
CPC ............. *F03D 17/00* (2016.05); *G01N 29/14* (2013.01); *F05B 2260/80* (2013.01);
(Continued)

(58) Field of Classification Search
CPC ........ F03D 17/00; F03D 1/0675; F03D 7/048; F03D 80/30; G01N 29/14;
(Continued)

(56) References Cited

U.S. PATENT DOCUMENTS 9,581,141 B2    2/2017  Frey et al.
10,337,502 B2   7/2019  Frey et al.
(Continued)

FOREIGN PATENT DOCUMENTS

CN    108 194 278 A    6/2018
ES    2 409 942 A1     6/2013
(Continued)

OTHER PUBLICATIONS

European Patent Office, Communication, Extended European Search Report issued for Application No. 20181061.1, dated Nov. 25, 2020, 8 pages.

*Primary Examiner* — Jacques M Saint Surin
(74) *Attorney, Agent, or Firm* — Norton Rose Fulbright US LLP

(57) ABSTRACT

Embodiments of the present disclosure provide systems, methods, and computer-readable storage media configured to monitor wind turbines and detect damage to one or more components of the wind turbines, such as damage to the blades. The techniques disclosed herein may utilize sensors (e.g., acoustic sensors) disposed within air cavities of one or more blades of the wind turbines to detect acoustic signals or acoustic energy caused by corrosive impacts (e.g., wind, dust, rain, hail, lightning, etc.) to the wind turbine. Information associated with the acoustic signals may be provided to and received by a processor used to determine whether one or more of the blades of the wind turbines have been damaged. The techniques disclosed herein may facilitate real-time or near-real-time monitoring of wind turbines for damage, which may enable more efficient operation and maintenance of wind turbines.

20 Claims, 7 Drawing Sheets

(52) U.S. Cl.
CPC ..... *F05B 2270/333* (2013.01); *F05B 2270/81* (2013.01); *G01N 2291/2693* (2013.01)

(58) Field of Classification Search
CPC ......... G01N 2291/2693; F05B 2260/80; F05B 2270/333; F05B 2270/81; Y02E 10/72
USPC .......................................................... 73/587
See application file for complete search history.

(56) References Cited

U.S. PATENT DOCUMENTS

| | | |
|---|---|---|
| 10,677,765 B2 | 6/2020 | Raso et al. |
| 11,168,668 B2 * | 11/2021 | Lowenhar ............... F03D 17/00 |
| 2011/0265575 A1 | 11/2011 | Koste et al. |
| 2012/0141275 A1 | 6/2012 | Hiremath et al. |

FOREIGN PATENT DOCUMENTS

| | | |
|---|---|---|
| WO | WO-2014/145511 A1 | 9/2014 |
| WO | WO-2015/065873 A2 | 5/2015 |

* cited by examiner

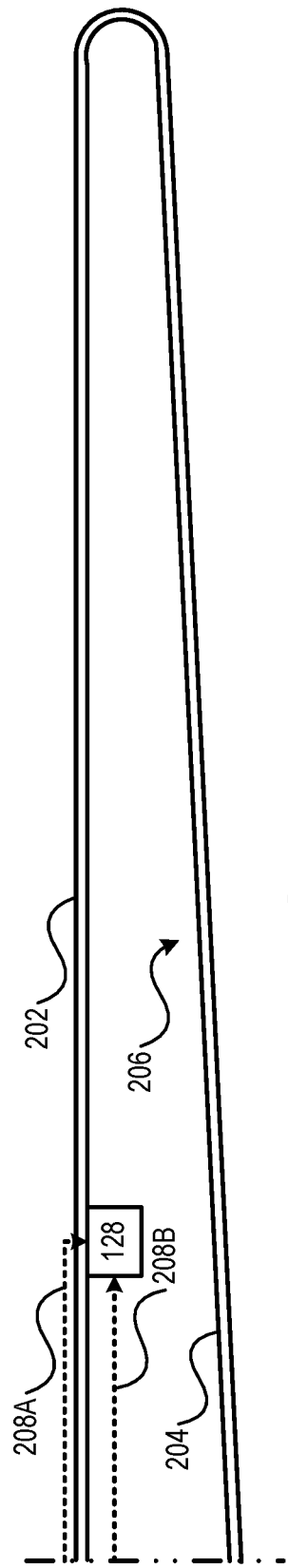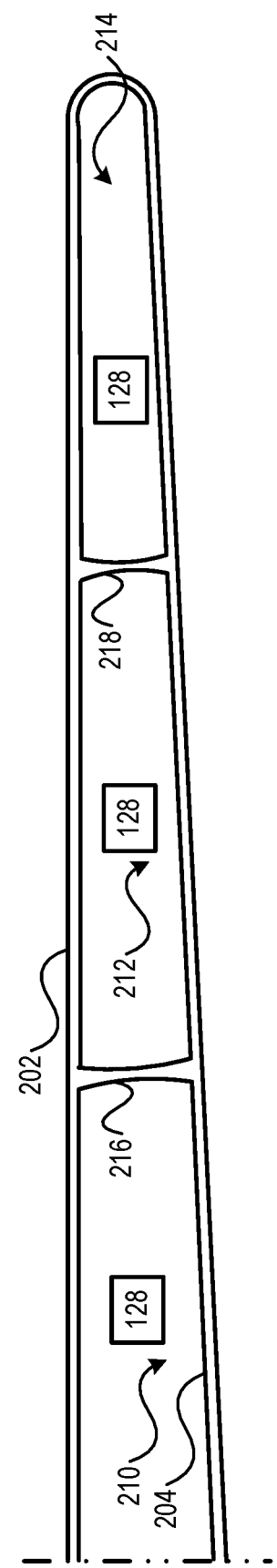

WIND TURBINE BLADE MONITORING SYSTEMS

CROSS-REFERENCE TO RELATED APPLICATIONS

The present application is a continuation of U.S. patent application Ser. No. 16/450,892 filed Jun. 24, 2019 and entitled "WIND TURBINE BLADE MONITORING SYSTEMS," the disclosure of which is incorporated by reference herein in its entirety.

TECHNICAL FIELD

The present application is directed toward wind turbine systems and including systems and methods for monitoring the development of damage mechanisms (including impacts, structural failure, and erosive environmental factors) on wind turbine blades.

BACKGROUND

Wind turbines have become a widespread source for renewable energy. However, loading, impacts, and corrosive elements present in the environments where wind turbines are deployed may cause damage to components of the wind turbines over time. Presently, detection of damage caused to wind turbines by environmental factors is accomplished via manual inspections, which may be periodically scheduled according to a defined time interval, such as every 5 years. However, such an approach is costly, time consuming, and potentially results in more significant damage being caused to the wind turbine (e.g., if damage occurs and is not fixed in a timely manner, a small amount of damage may develop into more significant damage).

SUMMARY

Systems, methods, and computer-readable storage media facilitating operations to monitor wind turbines and detect damage to one or more components of the wind turbines, such as damage to the blades, are disclosed. Wind turbines may be configured with sensors (e.g., acoustic sensors) configured to detect acoustic signals or acoustic energy caused by corrosive impacts (e.g., wind, dust, rain, hail, lightning, etc.) to the wind turbine, such as impacts to the blades, in addition to acoustic energy released by the damage propagation itself. Recently, wind turbines have started being designed with blades that are formed from a shell, such as an outer skin having one or more air cavities defined within the shell. The one or more sensors may be disposed within the air cavities of one or more blades and the acoustic signals may be detected as the signals travel within the air cavity. Stated another way, the air cavity may provide an air column in which the acoustic signals may propagate and the shell of the blade and air column may function as waveguides to facilitate detection of the acoustic signals by the one or more sensors.

Information associated with the acoustic signals may be provided (e.g., via a network communication link) to and received by a processor, such as a processor of a remote server or another electronic computing device. The server or other electronic computing device may analyze the information associated with the acoustic signals to determine whether one or more of the blades of the wind turbines have been damaged. For example, as the blades are damaged by corrosive impacts, characteristics of the acoustic signals may change, which may facilitate the detection of damage (or potential damage) to the blades. Additionally, sensor data generated by acoustic sensors associated with different wind turbines may be compared in order to detect damage to one or more wind turbines.

The monitoring techniques disclosed herein may facilitate real-time or near-real-time monitoring of wind turbines for damage. This may enable more efficient operation and maintenance of wind turbines. For example, rather than waiting a defined period of time, such as waiting for a periodic inspection to come due, embodiments may facilitate detection of damage at or near the time the damage occurs and a notification may be generated. The notification may cause a technician or other personnel to visit and inspect the wind turbine for which the damage (or potential damage) was identified, allowing the damage to be corrected via repair or replacement of one or more components. This may prevent more severe damage from occurring. Additionally, the monitoring techniques disclosed herein may reduce the amount of time that the wind turbines are taken out of service (e.g., because wind turbines for which no damage has been detected may not require inspection and repair, and repairs carried out promptly are potentially smaller).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 2A is a block diagram illustrating exemplary aspects of configuring acoustic sensors disposed on a portion of a wind turbine blade according to some embodiments of the present disclosure;

FIG. 2B is a block diagram illustrating exemplary aspects of configuring acoustic sensors disposed on a portion of a wind turbine blade according to some embodiments of the present disclosure;

DETAILED DESCRIPTION

The detailed description set forth below, in connection with the appended drawings and presentations, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Figure 1:
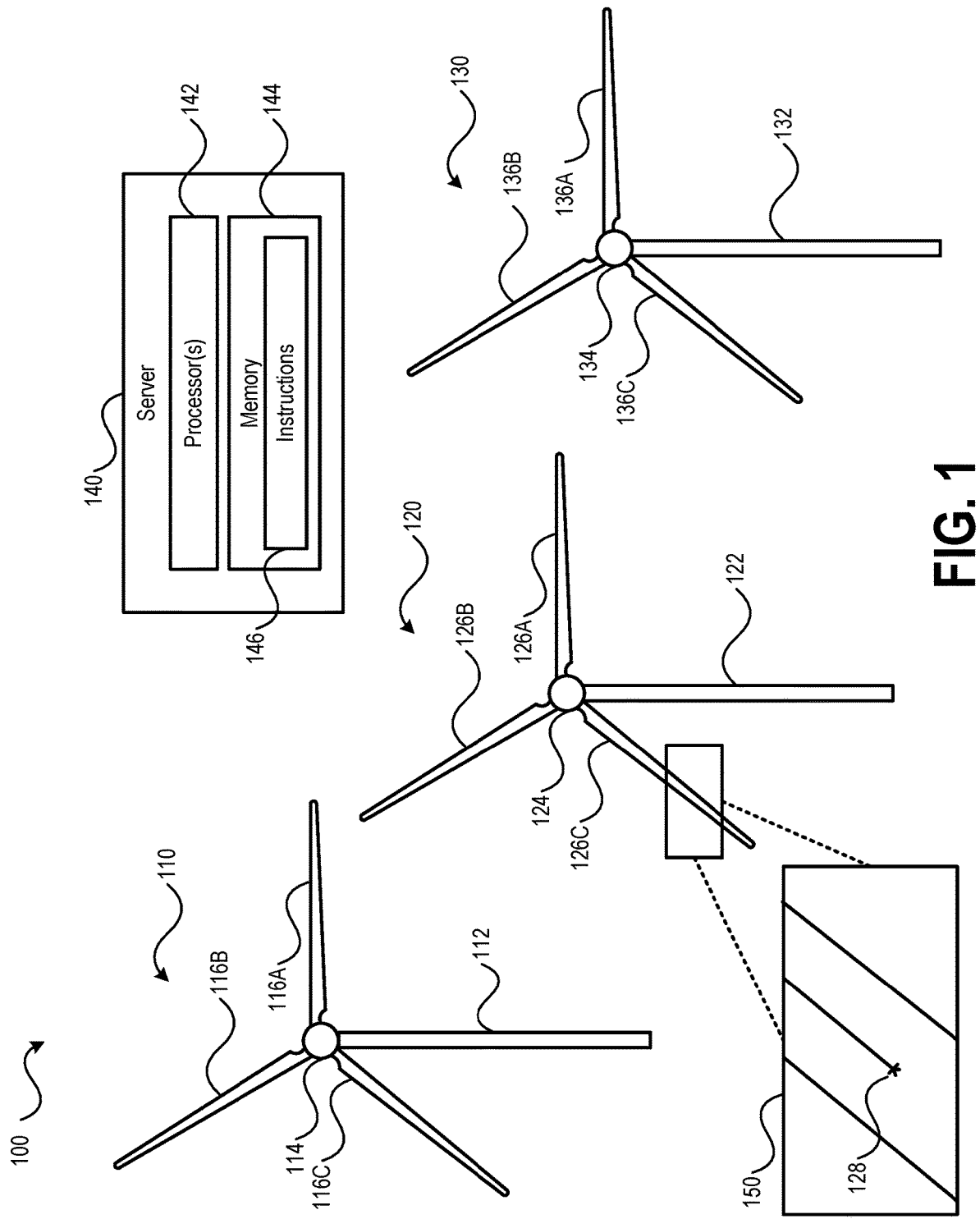
FIG. 1 is a block diagram illustrating a system for monitoring wind turbines in accordance with embodiments of the present disclosure.

Referring to FIG. 1, a block diagram illustrating a system for monitoring wind turbines in accordance with embodiments of the present disclosure is shown as a system 100. As shown in FIG. 1, the system 100 may include a plurality of wind turbines 110, 120, 130 and a server 140, which may include one or more standalone servers or may be provided via a cloud based system having a plurality of processing resources adapted to perform the functions described herein with respect to server 140. The plurality of wind turbines may be configured generate electrical power from wind and provide the electrical power to one or more external systems, such as devices, batteries, a power grid, and the like.

Each of the plurality of wind turbines 110, 120, 130 may include a tower, a power generation unit, and one or more blades. For example, the wind turbine 110 includes a tower 112, a power generation unit 114, and a plurality of blades 116A, 116B, 116C; the wind turbine 120 includes a tower 122, a power generation unit 124, and a plurality of blades 126A, 126B, 126C; and the wind turbine 130 includes a tower 132, a power generation unit 134, and a plurality of blades 136A, 136B, 136C. Each of the towers 112, 122, 132 may be anchored to the ground and one or more power cables (not shown for simplicity of the figure) may be disposed within the towers to carry generated electrical power from the power generations units 114, 124, 134, respectively, to the external systems or a transport line that transports the generated electrical power to the external systems.

Each of the power generation units 114, 124, 134 may include a generator, a nacelle, a gear box, and other components that facilitate generation of electrical power in response to rotation of the blades. For example, the plurality of wind turbines 110, 120, 130 may be deployed in an area where wind frequently occurs and the wind may cause rotation of the plurality of blades of each of the plurality of wind turbines 110, 120, 130, which enables the power generation units 114, 124, 134 to produce electrical power.

During operation of the system 100, the blades of each of the plurality of wind turbines 110, 120, 130 may be exposed to corrosive forces that may cause damage to the blades over time. Examples of the corrosive forces that may be present in the environment where the plurality of wind turbines are deployed include stress, wind, rain, hail, ice blocks, lightning, or a combination of these different forces. To detect the damaged caused to the blades by these corrosive forces, one or more sensors may be integrated with the wind turbine. The one or more sensors may include sensors disposed within or on the blades, as illustrated in cutout 150, which shows an acoustic sensor 128 disposed on or within the blade 126C of wind turbine 120. The acoustic sensor 128 may include microphones, transducers, piezo electric sensors, or other types of sensors configured to detect damage caused to the blade 126C by corrosive elements and forces present in the environment where the wind turbine 120 is operating, as described in more detail below.

Referring to FIGS. 2A and 2B, block diagrams illustrating exemplary aspects of configuring acoustic sensors disposed on a portion of a wind turbine blade are shown. As shown in FIGS. 2A and 2B, a wind turbine blade may include an outer surface 202 and an inner surface 204 and a cavity may be defined within the blade, such as air cavity 206. An acoustic sensor, such as acoustic sensor 128 of FIG. 1, may be disposed within the air cavity 206 of the blade (i.e., the acoustic sensor 128 is disposed inside the blade). The acoustic sensor 128 may include microphones, transducers, piezoelectrics, or other types of sensors configured to perform the operations described herein with respect to the acoustic sensor 128. As shown in FIG. 2A, the sensor may be powered via a power line 208A that runs along the outer surface 202 of the blade and then enters the cavity 206 through a hole that penetrates the outer surface 202 and the inner surface 204 of the blade proximate to the location where the acoustic sensor 128. It is noted that utilizing power lines that run external to the blade may not be desirable as it may increase the risk of a lightning strike to the blade. Accordingly, appropriate shielding may be provided to mitigate the likelihood of a lightning strike if power lines are run outside the blade, which may occur in situations where it may not be practical to deploy the acoustic sensors and power lines within the air cavity of the blade, such as retrofitting an existing wind turbine to operate in accordance with embodiments. Alternatively, the acoustic sensor 128 may be powered via a power line 208B that runs internal to the cavity 206 instead of along the outer surface 202. It is noted that utilizing the technique described above with respect to the power line 208A (e.g., where the power line is ran external to the blade) may enable existing systems to be retrofitted with acoustic sensors in accordance with embodiments of the present disclosure more easily than utilizing the technique described above with respect to the power line 208B (e.g., where the power line is run internal to the blade). Using internal power lines (e.g., power line 208B) may be beneficial for some applications and may result in reduced maintenance costs over time (e.g., external power lines may be more susceptible to damage than the internal power lines). It is noted that the acoustic sensor(s) 128 may be communicatively coupled to one or more communication lines. For example, a communication line may be communicatively coupled to the acoustic sensor 128 in order to provide acoustic sensor data (e.g., information generated in response to excitation of the acoustic sensor 128) to a remote or external electronic device, such as server 140 or a memory device located at or proximate to the tower, as described in more detail below. In an aspect, the acoustic sensors may be powered by another power source (e.g., other than power lines 208A, 208B), such as a battery and/or a wireless power generation unit (e.g., a device configured to generate power in response to a wireless interrogation signal or another technique), or power and communication may be provided via optical fiber, thereby negating risk from lightning strike.

Although FIG. 2A illustrates only a single acoustic sensor 128, it is noted that blades may be configured with more than one acoustic sensor in accordance with aspects of the present disclosure. For example, in FIG. 2B, a blade that includes 3 acoustic sensors 128 is shown. One factor that may be considered when determining whether to use a single acoustic sensor or multiple acoustic sensors is the number of air cavities within the blade. The blade illustrated in FIG. 2B includes support structures 216 and 218 that divide the air cavity within the blade into multiple air cavities, such as air cavities 210, 212, 214. The support structures 216 and 218 may be provided to increase the structural integrity of the blade or for other purposes. For blades with multiple air cavities, such as the blade illustrated in FIG. 2B, one or more acoustic sensors may be placed into each of the air cavities. To illustrate, in FIG. 2B, a first acoustic sensor 128 may be disposed within air cavity 210, a second acoustic sensor 128 may be disposed within air cavity 212, and a third acoustic sensor 128 may be disposed within air cavity 214. It is noted that the acoustic sensors illustrated in FIG. 2B may be powered using either of the techniques described above with respect to FIG. 2A and the power lines 208A and 208B depending on the particular deployment scenario and configuration of the blade. It is noted that the exemplary configuration of acoustic sensors within multiple air cavities of a single blade illustrated in FIG. 2B has been provided for purposes of illustration, rather than by way of limitation and that blades having two or more air cavities may be configured for monitoring using a single acoustic sensor for the entire blade, one acoustic sensor per air cavity, or multiple acoustic sensors within each air cavity. Additionally, it is noted that wind turbines operated in accordance with the present disclosure may include a single air cavity (e.g., as shown in FIG. 2A) or may include two or more air cavities (e.g., as shown in FIG. 2B). Accordingly, the present disclosure should not be limited to a specific number of acoustic sensors per blade, a specific number of air cavities, or that an acoustic sensor be placed in each air cavity of the blade (e.g., for blades having multiple air cavities).

It is noted that the techniques disclosed herein may enable predictions to be made regarding a location where the blade has been damaged (or potentially damaged). As an example, where multiple sensors are utilized on a single blade, whether the blade includes a single air cavity (e.g., FIG. 2A) or multiple air cavities (e.g., FIG. 2B), a prediction as to the location of the damage or potential damage may be facilitated based on differences in the acoustic energy detected by the multiple sensors, or from the time arrivals of different wave modes on an individual sensor. For example, sensor data for each sensor on a blade may be compared to each other and where a first sensor of the blade detects the acoustic energy before other sensors of the blade, or where the acoustic energy detected by the first sensor is stronger than the acoustic energy of the other sensors of the blade, the damage may be predicted to have occurred proximate to the location of the first sensor. Thus, the location of the first sensor may be used to predict a location where the damage occurred. Additionally, the acoustic energy detected by two different sensor may suggest that the damage likely occurred between two sensors depending on the particular characteristics of the acoustic energy detected by the two sensors and/or the time at which the acoustic energy is received by the two sensors. Where a single sensor per blade is used, and mounted so that it is capable of detecting sound transmitted through both the air and the structure, distance to the source of an impact may be determined. This makes use of the difference in arrival times between sound transmitted via the structure, which arrives first, to sound transmitted through the air, which arrives later as a result of its lower velocity of propagation.

Referring back to FIG. 1, the system 100 may be configured to detect damage to the plurality of wind turbines 110, 120, 130 based on sensor data generated by the sensors disposed within the blades of the wind turbines. As the wind turbines 110, 120, 130 are operated, wind, dust, hail, rain, and other environmental factors may create erosive impacts on surfaces of the blades. These erosive impacts may produce high-frequency acoustic energy that may be detected by the acoustic sensors 128. For example, the high-frequency acoustic energy may propagate through the air columns within the cavities of the blades and the shell of the blade may act as a waveguide that directs the acoustic energy to the acoustic sensors 128 and output to the external electronic device (e.g., the server 140) or stored in a memory device. As the blade(s) is damaged by the erosive impacts over time, in addition to detecting these events, changes may occur to the acoustic energy generated during normal operation and transmitted through the blade into the air column, which may change the characteristics of the outputs produced by the acoustic sensor(s) 128. For example, the blades may be constructed as a shell, which may be provided with a protective coating, such as paint or some other coating material designed to prevent certain types of damage to the structure of the blade. Over time the erosive impacts caused by wind, dust, hail, and rain may wear down the coating material, which may leave the underlying structure directly exposed to the erosive impacts. Once this occurs, the erosive forces may cause damage to the underlying structural material as well as other areas of the blade where perhaps the coating is still intact. These changes to the blade may be detected via the changes (e.g., levels and frequency content) in the acoustic energy detected by the one or more acoustic sensors 128 and may be used to evaluate when blades need to be inspected (e.g., to determine whether the blade needs repairs or replacement).

Detecting damage to the blades using the acoustic sensors 128 may facilitate more efficient monitoring of damage to the wind turbines 110, 120, 130. For example, each of the acoustic sensors 128 may be configured to provide sensor data to an external device, such as the server 140, or to a memory local to the respective tower(s), or direct to the cloud. The sensor data may include information associated with the acoustic signals or energy detected by the acoustic sensors 128. The sensor data may also include a timestamp that indicates when the sensor data was generated, information that identifies the blade and/or wind turbine associated with the sensor data (e.g., the location of the sensor that generated the sensor data), or both the timestamp and the location information. It is noted that the information that indicates the source of the sensor data may be provided in various ways. An identifier formed from an encoded sequence of letters, numbers, symbols, or a combination thereof may be used. For example, an identifier "B1-T1", may identify blade 1 (e.g., one of the blades 116A-116C) of wind turbine 1 (e.g., wind turbine 110). Additionally or alternatively, the identifier may be an un-encoded sequence of letters, numbers, symbols, or a combination thereof that may be mapped to a specific wind turbine and/or a specific blade/sensor. For example, the identifier may be a string such as "100013254" and mapping data stored at the server 140 (e.g., in the memory 144) may map the identifier to a particular blade (e.g., one of the blades 216A-126C of the wind turbine 120) or a particular acoustic sensor (e.g., the acoustic sensor 128 disposed on one of the blades 216A-126C of the wind turbine 120). In this manner, the sensor data may be determined to correspond to a particular wind turbine and blade, which may facilitate identification of a particular wind turbine blade that has suffered damage due to corrosive forces present in the environment where the wind turbines are operating. It is noted that the exemplary techniques described above for associating information that identifies a source of sensor data have been provided for purposes of illustration, rather than by way of limitation and that other techniques for identifying or associating components of the system 100 with sensor data may be utilized in accordance with embodiments of the present disclosure, such as using a serial number of the acoustic sensor, or some other information.

As shown in FIG. 1, the server 140 may include one or more processors 142 and a memory 144. The memory 144 may include one or more hard disk drives (HDDs), one or more solid state drives (SSDs), flash memory devices, read only memory (ROM) devices, random access memory (RAM) devices, or other memory devices configured to store data in a persistent or non-persistent state. The memory 144 may store instructions 146 that, when executed by the one or more processors 142, cause the one or more processors to perform the operations described in connection with the server 140. When the sensor data is provided to the server 140, the sensor data may be automatically analyzed to determine whether damage has occurred to the blades. To illustrate, the server 140 may receive, via a network, information associated with the acoustic signals detected by the one or more sensors. The server 140 may determine whether the blade is damaged based on the information associated with the acoustic signals. For example, the server 140 may be configured to determine whether the blade has been damaged by the corrosive forces (e.g., wind, rain, dust, hail, lightning, or a combination thereof) based on detected changes in the acoustic signals. When the corrosive forces of the impacts to the blades by wind, rain, dust, hail, or lightning occur, the associated acoustic signals may be different depending on whether the impacts occur to the protective coating or the bare structural material of the blade (e.g., after the protective coating has been eroded). By analyzing the acoustic signal information over time, the server 140 may be able to detect damage to the protective coating and/or the blade by determining whether a current snapshot of the acoustic signals are characteristic of a healthy blade (e.g., a blade for which the protective coating is substantially intact), a moderately healthy blade (e.g., a blade for which the protective coating is damaged but not completely eroded over major portions of the blade), a moderately unhealthy blade (e.g., a blade for which the protective coating has been eroded away exposing the underlying structural material to corrosive impacts), or an unhealthy blade (e.g., a blade for which severe damage has occurred to the underlying structural material). It is noted that the different classifications of damaged (or undamaged) blades described above have been provided for purposes of illustration, rather than by way of limitation and that other exemplary classifications or evaluations of the damage to a blade of a wind turbine may be utilized in some aspects of the present disclosure.

As explained above, repeated exposure to corrosive forces such as wind, rain, dust, and hail may result in long-term damage or erosion of the blade coating and eventually the blade material itself. These erosive impacts cause high-frequency acoustic energy which may be detected using the acoustic sensors disposed inside the blade, which may be mounted to an inner surface of the blade shell or suspended (e.g., via a mounting device or bracket) within the air column defined by the inner air cavity or cavities of the blade. The sensor data generated by the acoustic sensors may include information associated with measurements of the total acoustic high-frequency energy detected by the sensors, such as may occur during periods of time when corrosive forces cause erosion of the blade(s). The sensor data may provide a means for measuring the cumulative erosive effects of the corrosive forces, which may be used to schedule and prioritize inspection and maintenance of the blades. In an aspect, the particular measurement parameter represented by the sensor data may be the corrected absolute energy, which may be obtained by squaring and summing each sample of the acoustic waveform, and removing a value that equates to non-erosive operating conditions. The corrected absolute energy detected by a particular acoustic sensor may be accumulated over time, which may represent the cumulative erosive effect that the corrosive forces have had on the blades during the corresponding time period over which those measurements were accumulated. The server 140 may be configured to determine that a blade is damaged and/or should be inspected for potential maintenance or repair when the accumulated corrected absolute energy satisfies a threshold. For example, the accumulated corrected absolute energy may satisfy the threshold when the accumulated corrected absolute energy is greater than (>) the threshold or when the accumulated corrected absolute energy is greater than or equal to ($\geq$) the threshold. Alternatively, the accumulated corrected absolute energy may be determined to satisfy the threshold when a difference between the accumulated corrected absolute energy is less than (<) the threshold (e.g., T−E<0, where T is the threshold and E is the accumulated corrected absolute energy) or when a difference between the accumulated corrected absolute energy is less than or equal to ($\leq$) the threshold (e.g., T−E$\leq$0, where T is the threshold and E is the accumulated corrected absolute energy). As shown above, the particular manner of detecting that a blade is damaged based on a measurement parameter derived from the acoustic energy detected by the acoustic sensor(s) may be accomplished in a variety of ways. It is to be understood that the specific examples provided herein have been provided by way of illustration, rather than by way of limitation, and that determining whether a blade has been damaged based on sensor data in accordance with aspects of the present disclosure may be accomplished using other techniques or measurement parameters. Also, it is noted that the cumulative corrected absolute energy may be periodically reset, such as when a blade is replaced or repaired.

In an aspect, during analysis of the information associated with the sensor data, the sensor data associated with different blades of a wind turbine may be compared to each other and damage (or potential damage) may be detected when the sensor data from one of the blades is different from the sensor data of the other blades, where the difference may be determined based on a threshold tolerance (e.g., some variation between the sensor data may be ignored, but a variation that exceeds some threshold may indicate potential damage). For example, information associated with acoustic signals detected by a first acoustic sensor may be generated and received (e.g., by server 140 or another electronic computing device) and additional information associated with acoustic signals detected by one or more additional acoustic sensors (e.g., acoustic sensors associated with other blades of the wind turbine) may be generated and received (e.g., by server 140 or another electronic computing device). The received information may be used to determine (e.g., by the processor 142 of the server 140 or a processor of another electronic computing device) whether one of the blades has been damaged. To illustrate, where the accumulated corrected absolute energy for one blade differs from the accumulated corrected absolute energy for the one or more other blades of the wind turbine to within the threshold tolerance, the blade having the different accumulated corrected absolute energy may be determined to have been damaged. It is noted that such comparison based detection of damage to blades of a wind turbine may also be performed between multiple wind turbines, such as to compare the sensor data generated from sensors of one wind turbine to sensor data generated by one or more sensors of another wind turbine.

When the server 140 detects damage to one or more of the blades based on the sensor data received from the one or more sensors 128, a notification may be generated to notify one or more entities of the damage. For example, the notification may be generated as an e-mail message, a text message (e.g., a short message service (SMS) message or a multimedia messaging server (MMS) message), an automated voice response (AVR) message, an audible alert (e.g., a sound played on a user device, such as a workstation or computer communicatively coupled to the server 140 or a mobile device), a visual alert (e.g., activating or deactivating a light or some other visual cue) and may indicate that one or more blades of the plurality of wind turbines 110, 120, 130 have been potentially damaged. In response to the notification, a maintenance technician or other personnel may receive or be alerted to the notification and learn that one or more blades of the plurality of wind turbines 110, 120, 130 have been potentially damaged.

Upon learning of the potential damage, the person receiving the notification may inspect or schedule inspection of the wind turbines that are identified in the notification as potentially damaged. For example, the notification may include information that indicates which of the plurality of wind turbines 110, 120, 130 have been identified as potentially suffering damage due to the corrosive impacts caused by environmental forces (e.g., wind, hail, rain, dust, lightning, etc.) occurring within the environment where the plurality of wind turbines 110, 120, 130 are operating. As explained above, the particular wind turbines that have been damaged may be determined based on the information that identifies the source of the sensor data from which the potential damage was detected (e.g., based on changes to the acoustic energy detected by the acoustic sensors 128).

By identifying particular wind turbines that may have been damaged, the time and cost associated with inspecting the wind turbines to determine or confirm the severity of the damage and whether a blade or other component of the wind turbine(s) need to be repaired or replaced may be reduced. For example, previous techniques required a technician to periodically inspect the wind turbines regardless of whether any damage has occurred, such as inspecting the wind turbines every 5 years for scheduled maintenance. In contrast, regularly scheduled maintenance inspections are rendered unnecessary by embodiments of the present disclosure—instead, such inspections may only occur when at least one of the wind turbines is actually identified as potentially being damaged, as described above and elsewhere herein. In addition to reducing the time and cost associated with maintenance of the wind turbines, aspects of the present disclosure also provide real-time or near-real-time identification of damaged wind turbines. This capability enables damage to be identified and mitigated prior to more significant damage occurring. For example, suppose that a wind turbine is struck by lightning and one of the blades is significantly damaged. If this damage occurs well in advance of regularly scheduled maintenance according to previous techniques, the wind turbine may continue operation and further damage to the wind turbine may occur due to the lightning strike, such as further damage to the blade where the lightning strike occurred or damage to other components (e.g., the gear box, etc.) due to changes in the way that the damaged blade impacts operations of the wind turbine. According to the techniques disclosed herein, the lightning strike may be detected to have impacted the blade in real-time or near-real-time and a technician may be notified, in addition, comparison of the blade acoustic signature immediately before and immediately following the strike may determine if the strike has caused significant, minor, or no detectable damage to the blade. This allows the blade to be stopped immediately to avoid catastrophic failure, run at reduced load, or continue normal operation whilst inspection and maintenance decisions are prioritized.

It is noted that although the description above is primarily described with reference to detecting damage to the wind turbines via sensor data provided to the server 140, the present disclosure is not limited to such techniques. For example, the sensor data may be provided to a memory device (e.g., a HDD, a SSD, a flash memory device, or another memory device configured to store data in a persistent state) local to the plurality of wind turbines 110, 120, 130. The sensor data may be stored in the memory device for subsequent retrieval by a maintenance technician or other personnel tasked with periodically retrieving the sensor data for analysis. For example, the technician may periodically visit the plurality of wind turbines 110, 120, 130 and communicatively couple a computing device such as a laptop computing device, a tablet computing device, or another type of device configured to retrieve information from the memory device. In an aspect, the computing device may be communicatively coupled to the memory device via a cable connection (e.g., a universal serial bus (USB) connection, a serial connection, and the like), optical fiber, which may also provide power, or a wireless connection (e.g., a Bluetooth communication link, a 802.11 communication link, Zigbee, SigFox, LoRaWAN, and the like).

Once retrieved from the memory device, the sensor data may be analyzed by the computing device using the techniques described above, or may be transmitted or otherwise provided to the server 140 for analysis. It is noted that while storing the sensor data in the local memory device may be less efficient with respect to facilitating real-time or near-real-time detection of damage to the wind turbines, the cost in both terms of time and monetary value associated with retrieving the sensor data from the memory device may still be significantly lower than manual inspection of the wind turbines according to previous techniques, enabling the sensor data to be retrieved more frequently than manual inspections could feasibly be scheduled. Additionally, retrieval of the sensor data from the memory device may not require the wind turbines to be taken out of operation, which may be required to facilitate manual inspection, thereby increasing the operational efficiency of the wind turbines. Further, where the sensor data is retrieved from the local memory device(s) via a wireless communication link or connection, the retrieval of the sensor data may be accomplished very quickly, such as by a technician driving through the wind turbines and collecting the sensor data from the local memory device(s), possibly without even exiting the vehicle depending on the particular configuration of the system 100. As shown above, the system 100 facilitates improved accuracy with respect to detecting damage to wind turbines and also increases the speed at which damage to wind turbines may be detected, both of which represent significant improvements over previous techniques for detecting and mitigating damage for wind turbines. Such improvements may be facilitated by performing waveform analysis, frequency analysis, analysis of arrival times of wave modes associated with acoustic signals detected by the sensor(s) 128, and comparing information associated with acoustic signals corresponding to different blades, as described above, where such functionalities may be performed by the one or more processors (including embodiments where the one or more processors are deployed in the cloud). Further techniques and advantages for detecting and mitigating damage to wind turbines according to aspects of the present disclosure are described below.

Figure 3:
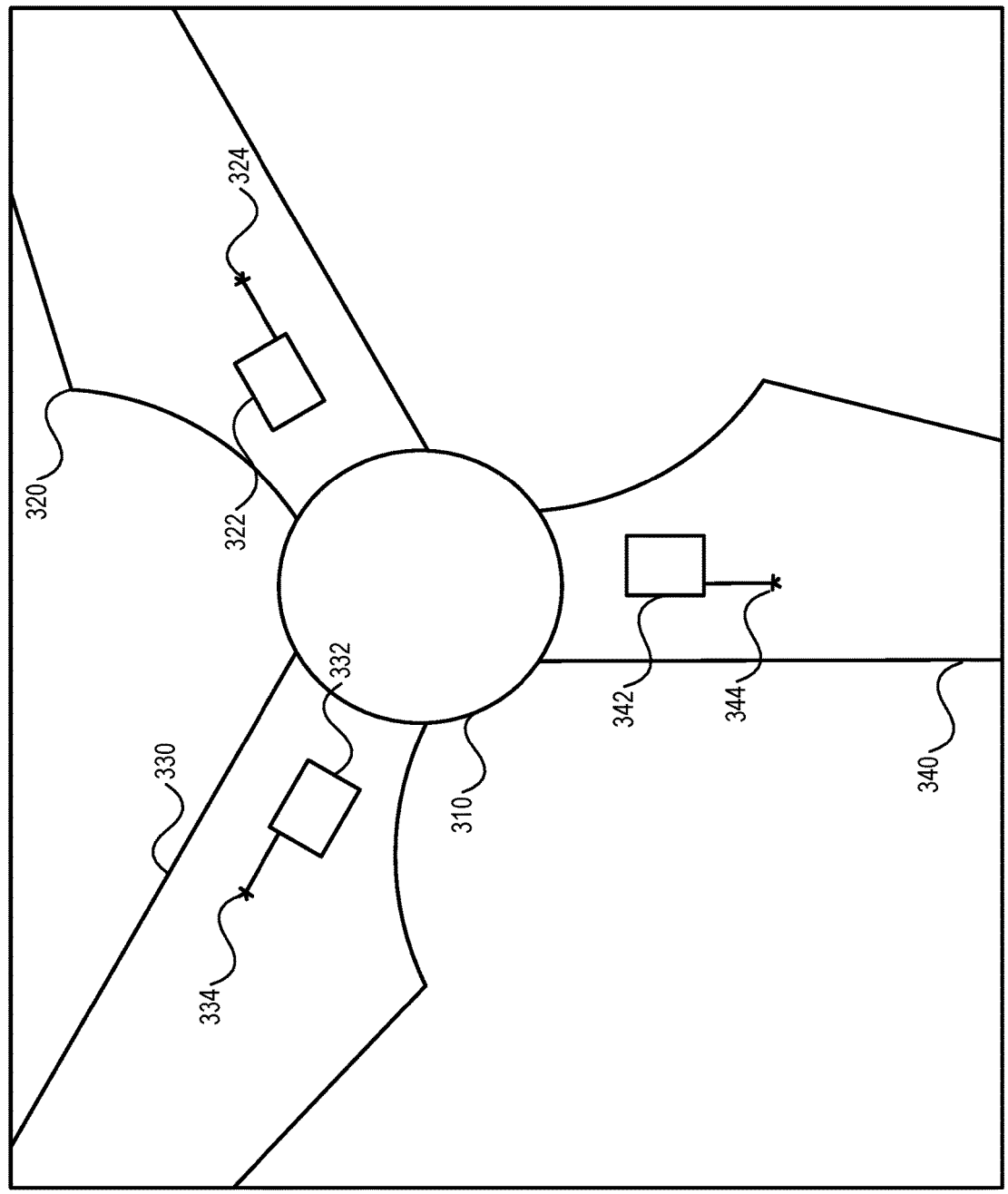
FIG. 3 is a block diagram illustrating an exemplary sensor configuration for detecting damage to a wind turbine according to aspects of the present disclosure.

Referring to FIG. 3, a block diagram illustrating an exemplary sensor configuration for detecting damage to a wind turbine according to aspects of the present disclosure is shown. As shown in FIG. 3, a wind turbine may include a power generation unit 310, a plurality of blades 320, 330, 340, and a tower (not shown in FIG. 3). As explained above, the power generation unit 310 may include a gear box, a nacelle, a generator, and other components that are configured to generate electrical power in response to rotation of the blades 320, 330, 340, where the rotation of the blades 320, 330, 340 is caused by wind. Each of the blades may include one or more acoustic sensors configured detect acoustic energy within an air column defined within a cavity of the blades, as described above. For example, blade 320 includes one or more acoustic sensors 324, blade 330 includes one or more acoustic sensors 334, and blade 340 includes one or more acoustic sensors 344. It is noted that the acoustic sensors 324, 334, 344 may be disposed along the length of the respective blades at a particular distance (e.g., when a single acoustic sensor is provided for each blade) or distances (e.g., when multiple acoustic sensors are provided for each blade). The location or distance where the acoustic sensors 324, 334, 344 are positioned may be configured to provide suitable detection of acoustic energy or signals caused by corrosive impacts on the blades 320, 330, 340. For example, placing the acoustic sensors 324, 334, 344 closer to the tip of the blade (i.e., the end opposite the power generation unit 310) may be beneficial as the changes to the acoustic signals may be greater near the blade tip (e.g., since turbulence at the blade tip may be more greatly impacted by erosion and damage as compared to other portions of the blade(s)). It is noted that the optimum sensor types and their placement may be a function of various factors that are blade specific, such as design of the wind turbine, the materials from which the wind turbine is constructed, cost, and performance.

The acoustic sensors 324, 334, 344 may be coupled to sensor modules 322, 332, 342, respectively, or they may be incorporated into a single unit. The sensor modules 322, 332, 342 may comprise pre-amplifiers, filtering circuitry, digital signal processors, and other components that facilitate operations to utilize sensor data to detect damage to the blades 320, 330, 340. For example, the sensor modules 322, 332, 342 may be Micro Structural Health Monitoring (SHM) modules available from Physical Acoustics. Such sensor modules are configured to communicatively couple to one or more acoustic sensors, include a memory (e.g., the local memory described above with reference to FIG. 1) for storing sensor data (e.g., the acoustic sensor data described above with reference to FIG. 1), and include capabilities to facilitate transmission of recorded sensor data over a network connection, such as a wired connection (e.g., Ethernet) or wireless communication links (e.g., a cellular communication link). In an embodiment, one or more base stations may be deployed around the area where the wind turbines are deployed to provide a local area network that may facilitate network transmission of sensor data, such as to the server 140 of FIG. 1. Additionally or alternatively, the local area network may facilitate access to the plurality of sensor modules 322, 332, 342 from a central location, such as enabling a technician to visit the site of the wind turbines and retrieve the sensor data recorded at the local memory (e.g., the memories of the sensor modules 322, 332, 342 or another local memory device) from a central location, thereby simplifying the process of retrieving the sensor data. The sensor modules 322, 332, 342 may also include a battery for providing auxiliary power in the event that a primary power source fails, or have long-life battery power. In embodiments, the sensor modules may be configured to draw power from the wind turbines when the wind turbines are producing electrical power, such as to charge the battery or to reduce the dependence on an external power source or power grid.

The sensor modules 322, 332, 342 and/or the sensors 324, 334, 344 may be configured to filter or attenuate certain acoustic signals. For example, the corrosive impacts to the blades 320, 330, 340 may produce high-frequency acoustic energy signals that may be detected by the sensors 324, 334, 344. However, the operation of the power generation unit 310 may produce low-frequency energy that could potentially corrupt or otherwise inhibit the detection of damage to the blades caused by the corrosive forces. The acoustic sensors 324, 334, 344 may be high-frequency sensors configured to attenuate low-frequency acoustic signals, such as the low-frequency acoustic signals that may be produced through operation of the power generation unit 310. Alternatively, the sensor modules 322, 332, 342 may be configured to reduce the impact of the low-frequency acoustic signals. For example, each of the acoustic sensors may include a high-frequency speaker, which may have a stiff diaphragm capable of withstanding the higher g's in the blade(s) of the wind turbine(s) and the sensor modules may include or be communicatively coupled to a low-noise, high-frequency, pre-amplifier. This may enhance the quality of the sensor data and provide more accurate evaluation of the sensor data, such as to improve the accuracy of determinations of whether the blades have been damaged by the corrosive forces present in the environment surrounding the wind turbine.

Figure 4:
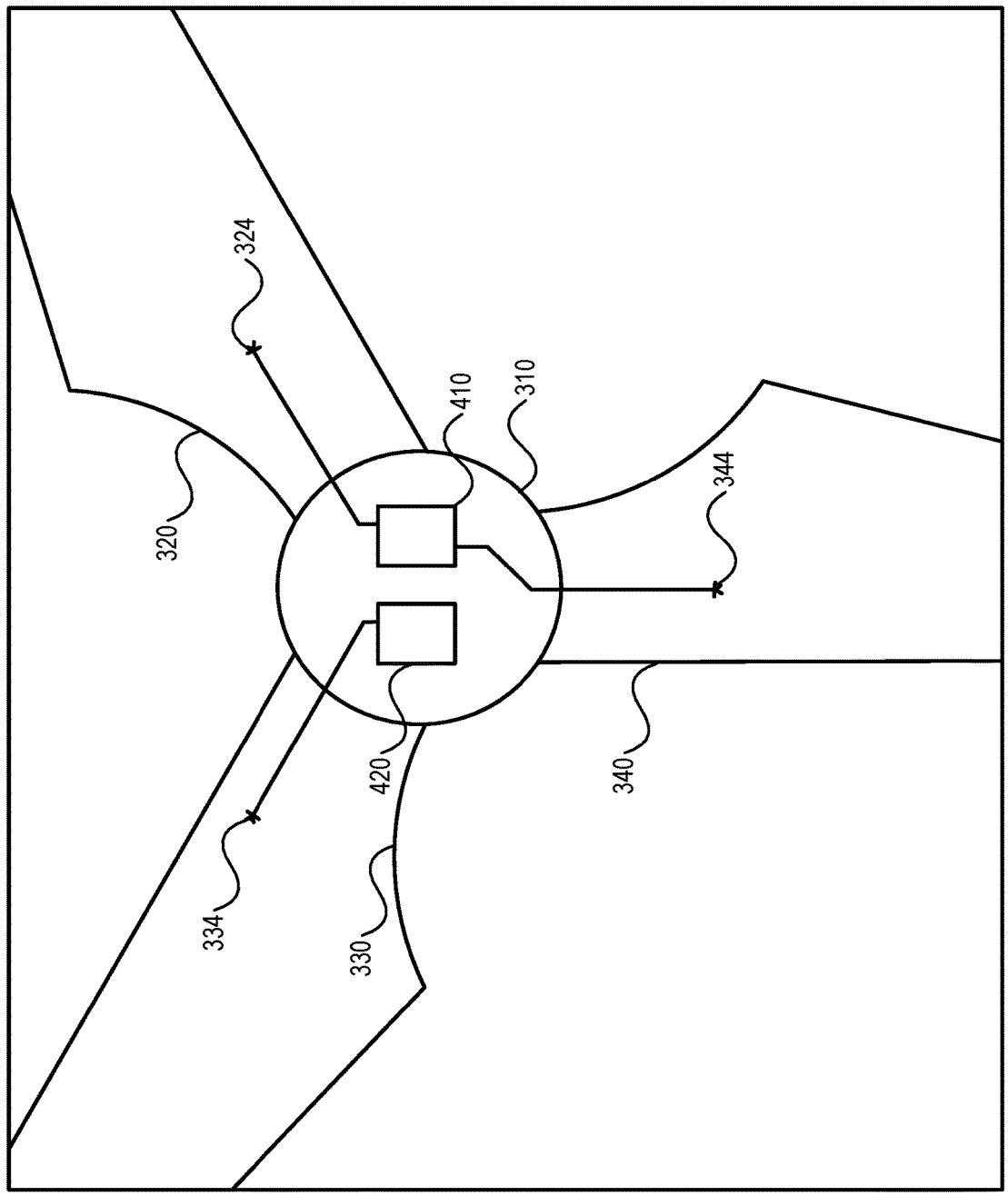
FIG. 4 is an additional block diagram illustrating exemplary sensor configurations for detecting damage to a wind turbine according to aspects of the present disclosure.
Figure 5:
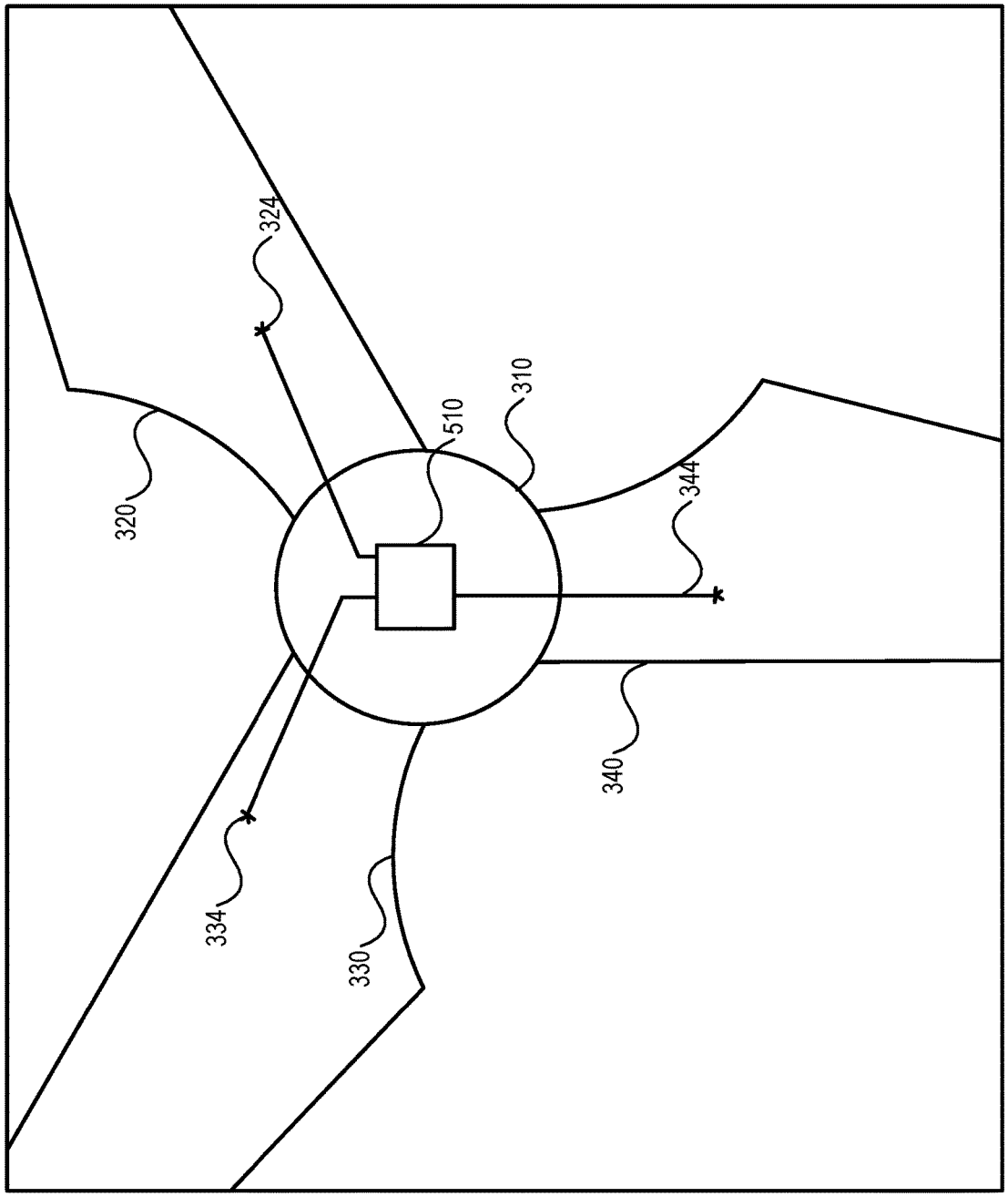
FIG. 5 is an additional block diagram illustrating exemplary sensor configurations for detecting damage to a wind turbine according to aspects of the present disclosure.

Referring to FIGS. 4 and 5, additional block diagram illustrating exemplary sensor configurations for detecting damage to a wind turbine according to aspects of the present disclosure are shown. In FIGS. 4 and 5, elements 320, 324, 330, 334, 340, and 344 refer to the components labeled with the same reference numbers FIG. 3, refer to similar components and are not described for simplicity of the disclosure. As shown in FIG. 4, rather than including sensor modules on each of the blades 310, 320, 330, two sensor modules 410, 420 may be disposed within the power generation unit 310 and may be communicatively coupled to one or more acoustic sensors. For example, the sensor module 410 may be communicatively coupled to acoustic sensor 324 positioned on or within blade 320 and to acoustic sensor 344 positioned on or within blade 340. Similarly, sensor module 420 may be communicatively coupled to acoustic sensor 334 positioned on or within blade 330. It is noted that the sensor modules 410, 420 may be similar to the sensor modules 322, 332, 342 described above with reference to FIG. 3. Similarly, FIG. 5 illustrates an embodiment where a single sensor module 510 is provided within power generation unit 310. The sensor module 510 may be similar to the sensor modules 322, 332, 342 described above with reference to FIG. 3, except the sensor module 510 may be communicatively coupled to the sensors 324, 334, 344 positioned on or within the blades 320, 330, 340, respectively. It is noted that the exemplary configurations illustrated in FIGS. 3-5 have been provided for purposes of illustration, rather than by way of limitation and demonstrate the diversity of the concepts disclosed herein, where sensors and sensor modules may be deployed in a variety of ways and configurations to facilitate monitoring of wind turbines utilizing the techniques of the present disclosure. Accordingly, it is to be understood that the concepts disclosed herein may be deployed using a single sensor per wind turbine or multiple sensors (e.g., multiple sensors per blade or one sensor per blade).

In deployments where for e.g. cost reasons a single sensor per turbine is used, the sensor data may be analyzed to determine whether damage is likely to have occurred to the blade from which the sensor data originated, as described above. In such a system, the damage determined based on the sensor data generated from the acoustic energy of the one blade may be assumed to also be present on the other blades of the wind turbine. Stated another way, it may be assumed that the corrosive impacts experienced by the blade on which the acoustic sensor is deployed were also present or experienced by the other blades of the wind turbine due to the close proximity of the blades and the fact that as the blades rotate they may experience similar exposure times to the corrosive effects of wind, dust, hail, rain, and other forces present in the environment where the wind turbine is operating.

One drawback of the single acoustic sensor per turbine approach described immediately above is that it may be difficult to isolate or associate certain types of damage to a specific blade. As an example, damage caused by lightning strikes may be blade specific and may not be accurately detected if the lightning strikes a blade that does not include the acoustic sensor. Utilizing a multi-sensor approach where at least one sensor is deployed for each blade of the wind turbine may overcome this challenge. For example, because each blade is equipped with an acoustic sensor, a lightning strike that impacts one of the blades may be more readily and accurately detected. In an aspect, detecting whether a lightning strike impacted or struck the blade may be determined based on a time difference of arrival technique. For example, the acoustic energy created by the lightning strike may travel faster through a first portion of the blade than through a second portion of the blade. One or more acoustic sensors deployed on the blade may be configured to detect acoustic energy travelling through the first portion of the blade (e.g., the blade structural components, such as the outer skin of the blade) and may detect acoustic energy travelling through the second portion of the blade (e.g., the air column within the air cavity defined by the outer skin of the blade). Based on the time difference of arrival of these two acoustic energy signals, the location of the lightning strike may be determined, which may be used to evaluate whether the lightning strike actually impacted the blade or simply occurred in close proximity to the blade. For example, the system may determine that the lightning strike actually impacted the blade when the distance between the blade and the location where the lightning strike occurred (as determined based on the time difference of arrival) satisfies a threshold distance (e.g., distance is < or ≤ the threshold distance), and the system may determine that the lightning strike did not actually impact the blade where the distance does not satisfy the threshold distance (e.g., distance is ≥ or > the threshold distance). It is noted that in some configurations, it may be beneficial to utilize multiple acoustic sensors per blade to facilitate lightning strike location. For example, a first acoustic sensor may be configured to detect the acoustic energy travelling through the skin of the blade (e.g., by positioning the acoustic sensor (internally) on the shell or skin of the blade) and a second acoustic sensor may be configured to detect the acoustic energy travelling through air column within the blade (e.g., by positioning the acoustic sensor (internally) within the air column of the blade—the sensor is suspended within the air column via a mounting device or bracket). Waveform analysis may be used to determine location using a single sensor if it is of a type and is mounted to respond to energy traveling in both the air column and the structure.

Figure 6:
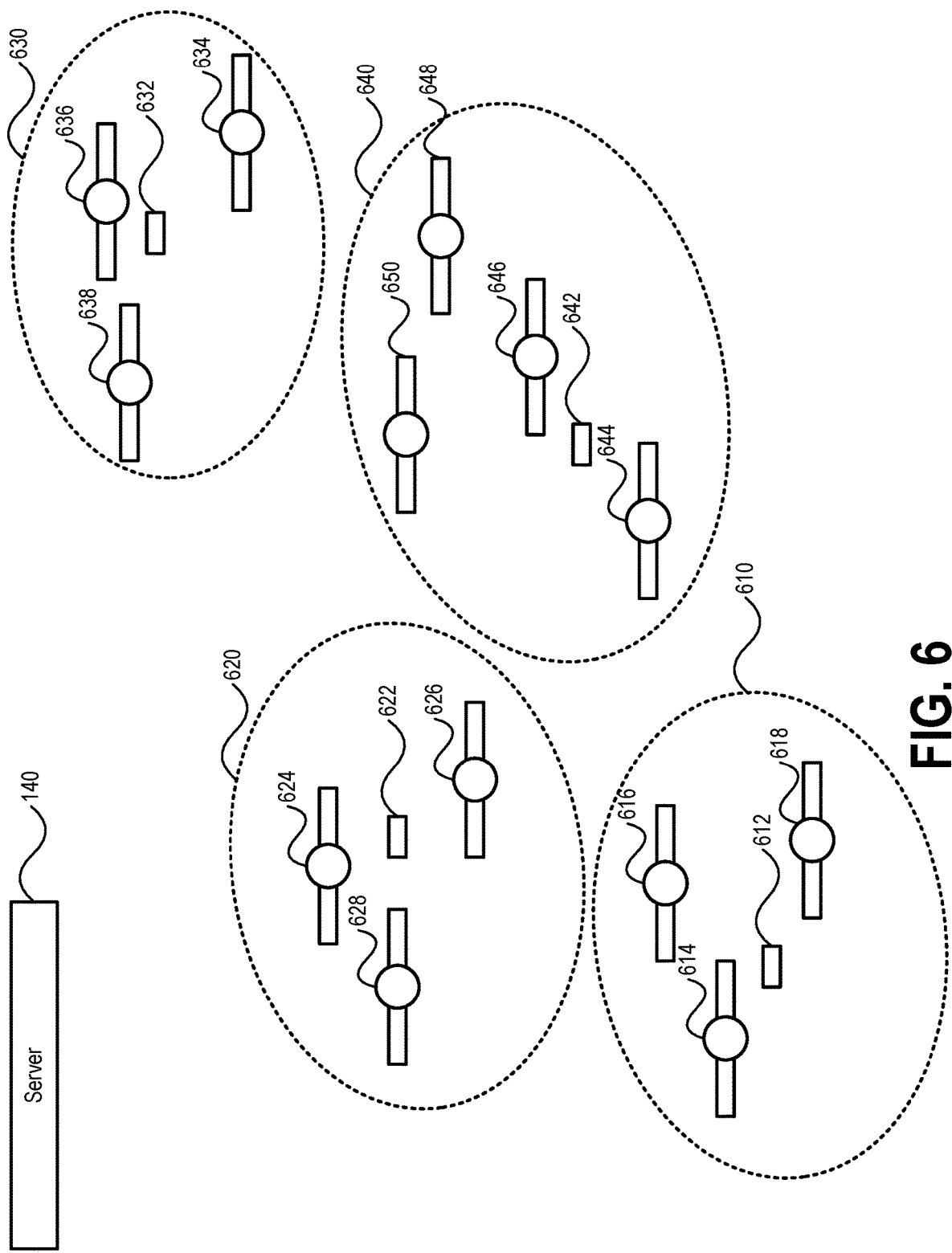
FIG. 6 is a block diagram illustrating additional techniques for monitoring wind turbines in accordance with aspects of the present disclosure.

Referring to FIG. 6, a block diagram illustrating additional techniques for monitoring wind turbines in accordance with aspects of the present disclosure is shown. In FIG. 6, the server 140 of FIG. 1 is shown. Additionally, a plurality of wind turbines 614, 616, 618, 624, 626, 628, 634, 636, 638, 644, 646, 648, and 650 are shown. Each of the plurality of wind turbines illustrated in FIG. 6 may include blades, a power generation unit, and a tower, as described above with reference to FIG. 1. The embodiment illustrated in FIG. 6 also includes of plurality of base stations 612, 622, 632, 642. As described above, the plurality of base stations may facilitate network communication between the server 140 and the plurality of wind turbines, such as to provide backhaul network communication links that may be utilized to provide sensor data to the server 140 or to enable sensor data generated by sensors disposed on the blades of the wind turbines to be transmitted to a local memory device for subsequent retrieval by a technician or to a local electronic computing device (e.g., a device of a technician proximate the base station) directly.

In FIG. 6, the plurality of wind turbines 614, 616, 618, 624, 626, 628, 634, 636, 638, 644, 646, 648, and 650 are divided into different clusters 610, 620, 630, 640. These clusters of wind turbines may represent a single wind turbine farm deployed in a geographic region or may represent multiple wind farms deployed across multiple geographic regions. The particular clusters may be determined or allocated in a variety of ways. For example, wind turbines may be assigned to a particular cluster based on proximity, such as allocating wind turbines that are within a threshold distance of a particular wind turbine to one cluster and wind turbines that are outside the threshold distance to one or more other clusters. Additionally, wind turbines may be allocated to a particular cluster based on characteristics of the geography where the wind turbines are deployed, such as assigning wind turbines deployed at similar elevations to one cluster and wind turbines at a different elevation to another cluster or by assigning wind turbines having a similar exposure to wind patterns to different clusters. It is noted that although FIG. 6 illustrates the clusters as including wind turbines that are in relatively close proximity to each other, embodiments are not limited to such configurations. For example, if the wind turbines 614, 616, 618, 648, and 650 are at the top of a mountain or share a similar elevation and wind turbines 644, 646 are in a valley or different relative elevation as compared to the wind turbines 614, 616, 618, 648, and 650, the wind turbines 614, 616, 618, 648, and 650 may be associated with one cluster and the wind turbines 644 and 646 may be associated with a different cluster.

As described above, in some aspects of the present disclosure one or more sensors (e.g., the sensors described above with reference to FIGS. 1-5) may be deployed on one of the wind turbines in each of the clusters 610, 620, 630, 640. In such an arrangement, the sensor data derived from the acoustic energy detected by the one or more sensors may represent the erosive effects of corrosive forces that have directly impacted the wind turbine associated with the one or more sensors. During monitoring, the erosive effects determined for that one wind turbine may be deemed to also have occurred at the other wind turbines within the relevant cluster. For example, when damage is predicted to have occurred at the wind turbine 614 of cluster 610 based on sensor data derived from one or more sensors deployed at the wind turbine 614, the server 140 may assume that similar damage has occurred at the wind turbines 616, 618. If the damage is severe enough to warrant an inspection, the server 140 may generate a notification configured to cause a technician to visit the cluster 610 and inspect the wind turbines 614, 616, 618 to evaluate whether maintenance and/or replacement of damaged components is needed, as described above with reference to FIG. 1. Similar operations may be performed by the server 140 with respect to the clusters 620, 630, 640 or comparisons of sensor data between different clusters may be performed, as described above with respect to comparing sensor data from different wind turbines to detect damage. Such an embodiment may enable a low cost deployment of sensors (e.g., because only one wind turbine needs to be configured with sensors) that enables the server 140 to monitor a plurality of wind turbines.

In additional aspects of the present disclosure, each of the blades of the plurality of wind turbines illustrated in FIG. 6 may be equipped with one or more sensors configured to detect acoustic energy that may be representative of the impact that corrosive forces have on the wind turbines. As described above, using multiple sensors on each of the wind turbines may improve the accuracy of damage determinations and enable additional types of damage to be identified, such as blade specific types of damage that may be caused by certain types of corrosive forces (e.g., lightning strikes).

It is noted that the monitoring techniques disclosed herein, as well as associating wind turbines with different clusters may also facilitate additional advantages over previous techniques used to maintain wind turbines in a good operating condition. For example, server 140 provides a centralized platform for monitoring multiple wind turbine deployments, which may be disposed across different counties, states, or even countries. This enables the monitoring to be performed more consistently and requires less coordination of personnel responsible for monitoring. Additionally, it enables maintenance to be performed in a more timely and efficient manner, such as not requiring maintenance to be performed at regularly scheduled time intervals, regardless of whether damage has occurred, as required by previous approaches, and enables such visits to be performed on an ad-hoc basis (e.g., when damage has or is likely to have occurred). This minimizes the amount of time that each wind turbine is taken offline (e.g., to facilitate inspection and repair by a technician) and increases the uptime for the wind turbines and the power output generated by the wind turbines. Additionally, because the monitoring may facilitate real-time or near-real-time detection of damage, maintenance may occur earlier on and may prevent more serious damage from occurring.

Another advantage provided by the monitoring approach disclosed herein may be the discovery of particular geographic areas where wind turbines may be operated more efficiently (e.g., less likely to suffer damage or longer intervals between repairs), as well as improved techniques for mitigating damage to wind turbines deployed in those particular geographic areas. To illustrate, suppose that cluster 610 corresponds to a coastal area and clusters 620, 630, 640 correspond to geographic areas that are inland (e.g., clusters 620 and 640 may correspond to hilly areas many miles from the coastal area associated with cluster 610 and cluster 630 may correspond to a mountain area further from the coast). These different clusters of wind turbines may be monitored for damage (e.g., by server 140) and over time may facilitate discovery of optimal regions for deploying wind turbines. To illustrate, the monitoring may reveal that the wind turbines associated with cluster 610 become damaged more frequently as compared to the wind turbines in clusters 620, 630, 640, possibly due to the corrosive effects of salt due to proximity of cluster 610 to the ocean. Another possibility may be that the monitoring reveals that the wind turbines in cluster 630 are more likely to suffer severe damage, such as damage that may be caused by lightning strikes or hail, as compared to clusters 610, 620, 640. This may indicate that the wind turbines in cluster 630 are less susceptible to damage caused by certain corrosive forces, such as rain and salt, but are more susceptible to suffering significant damage more quickly due to the severe weather that may occur more frequently in the mountainous area where cluster 630 is deployed. Thus, the monitoring capabilities provided by server 140 may enable identification of areas where wind turbines may be deployed in a manner that minimizes damage to the wind turbines over time and may also help identify additional measures that can be taken to optimize wind turbine deployments in certain geographic areas, such as applying different coatings to the blade shells depending on the types of corrosive forces present (e.g., coatings resistant to salt, dust, etc.) in the relevant geographic area where the wind turbines are to be deployed.

Figure 7:
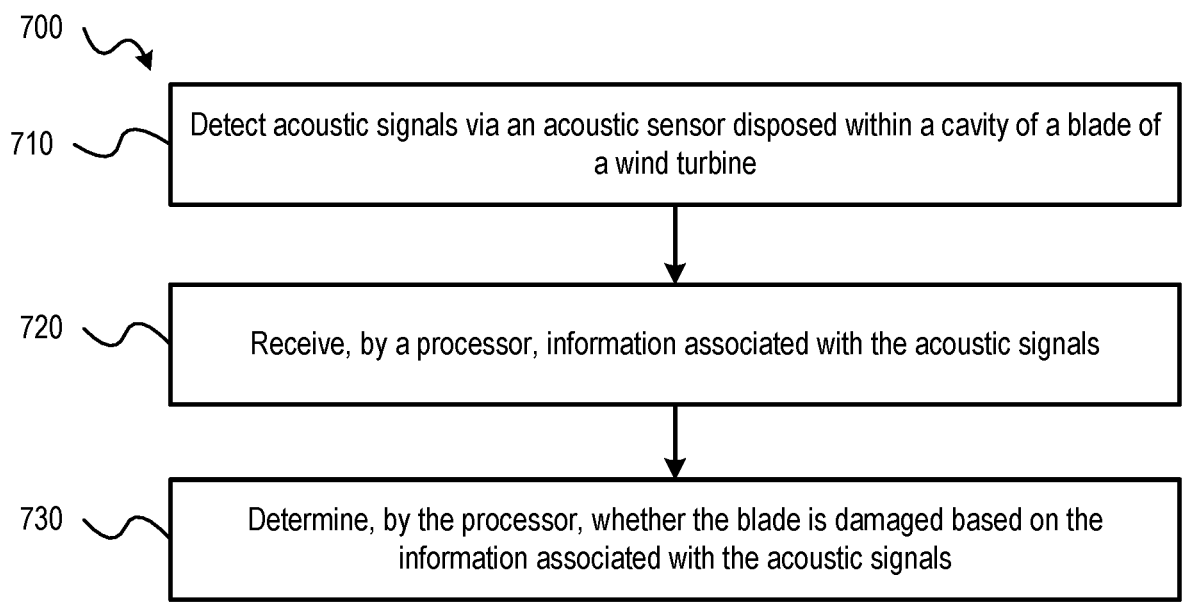
FIG. 7 is a block diagram of an exemplary method for monitoring wind turbines in accordance with aspects of the present disclosure.

Referring to FIG. 7, a block diagram of an exemplary method for monitoring wind turbines in accordance with aspects of the present disclosure is shown as a method 700. In an aspect, the method 700 may be performed by a system that includes a plurality of sensors and one or more electronic computing devices, such as the system 100 of FIG. 1. For example, at least some steps of the method may be stored as instructions (e.g., the instructions 144 of FIG. 1) that, when executed by one or more processors (e.g., the one or more processors 142 of FIG. 1), cause the one or more processors to perform the steps of the method 700.

As shown in FIG. 7, the method 700 may include, at step 710, detecting acoustic signals via an acoustic sensor disposed within a cavity of a blade of a wind turbine. As described above with reference to FIGS. 1-6, the acoustic signals may correspond to acoustic energy generated by corrosive impacts to the blade, which may be caused by wind, rain, hail, lightning, dust, or other corrosive forces that may be present within an environment where the wind turbine is deployed. At step 720, the method 700 includes receiving, by a processor, information associated with the acoustic signals. As explained above, the sensor data (e.g., the information associated with the acoustic signals detected by the sensor) may be transmitted (e.g., via a network communication link) to a server, such as server 140 of FIG. 1, or another electronic computing device (e.g., an electronic computing device associated with a technician or other personnel responsible for retrieving sensor data from the wind turbine(s)). Upon receiving the sensor data, the method 700 may include, at step 730, determining, by the processor, whether the blade is damaged based on the information associated with the acoustic signals. The determination of whether the blade is damaged may be performed using the exemplary techniques described above with reference to FIGS. 1-6. In an aspect, if the one or more processors detect that damage has occurred, the one or more processors may generate a notification, as described above with reference to FIG. 1. It is noted that the method 700 may also include detection of additional sensor data via additional sensors, which may be on the same blade or on other blades of the same wind turbine or different turbines, as described herein.

Although embodiments of the present application and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Moreover, the scope of the present application is not intended to be limited to the particular embodiments of the process, machine, manufacture, composition of matter, means, methods and steps described in the specification.

The invention claimed is:

1. A method comprising:
 detecting an acoustic signal via an acoustic sensor disposed within a cavity of a blade of a wind turbine;
 receiving, by a processor, information associated with the acoustic signal; and
 determining, by the processor, whether the blade is damaged or should be inspected based on the information associated with the acoustic signal, wherein the determining includes:
  measuring acoustic energy, based on the information associated with the acoustic signal, over a period of time; and
  quantifying an amount of erosion to the blade based on the acoustic energy measured over the period of time.

2. The method of claim 1, further comprising:
 comparing the quantified amount of erosion to a threshold; and
 determining that the blade is damaged or needs to be inspected based on the comparing.

3. The method of claim 1, wherein the quantifying includes accumulating over time a portion of the measured acoustic energy that represents an erosive effect on the blade.

4. The method of claim 3, wherein the quantifying includes subtracting a portion of the measured acoustic energy that represents non-erosive operating conditions.

5. The method of claim 3, further comprising:
 comparing the accumulated portion of the measured acoustic energy that represents the erosive effect to a threshold; and
 determining that the blade is damaged or needs to be inspected based on the comparing.

6. The method of claim 1, wherein the quantifying includes:
 measuring an acoustic energy of an impact to the blade by wind, rain, dust, hail, or lightning; and
 comparing the measured acoustic energy of the impact to a characteristic response of the blade to an impact by wind, rain, dust, hail, or lightning.

7. The method of claim 6, further comprising:
 comparing the measured acoustic energy of the impact to a plurality of different characteristic responses of the blade to impacts by wind, rain, dust, hail, or lightning, wherein the plurality of different characteristic responses correspond to different levels of health of the blade.

8. The method of claim 1, further comprising:
 detecting a plurality of acoustic signals via a plurality of acoustic sensors disposed within cavities of a plurality of blades of the wind turbine;
 wherein the determining includes:
  measuring a first acoustic energy based on the information associated with a first acoustic signal for a first blade of the plurality of blades;
  measuring a second acoustic energy associated with a second acoustic signal for a second blade of the plurality of blades; and
  determining a difference between the first acoustic energy and the second acoustic energy.

9. The method of claim 8, further comprising:
 comparing the difference between the first acoustic energy and the second acoustic energy to a threshold; and
 determining that at least one of the first blade or the second blade is damaged or needs to be inspected based on the comparing.

10. The method of claim 1, wherein the erosion to the blade is associated with the erosive effect on the blade of at least one of: wind, rain, hail, lightning, or an impact.

11. The method of claim 1, further comprising:
 transmitting the information associated with the acoustic signal to a remote computing device via a network communication link, wherein the remote computing device includes the processor.

12. The method of claim 1, further comprising:
 storing the information associated with the acoustic signal in a memory; and
 transmitting the information associated with the acoustic signal stored in the memory to a remote computing device communicatively coupled to the memory, wherein the remote computing device includes the processor.

13. The method of claim 1, further comprising:
 in response to determining that the blade is damaged or should be inspected, generating and sending an alert.

14. The method of claim 13, wherein the alert is at least one of: an e-mail message, a text message, an automated voice response message, an audible alert, or a visual alert.

15. A system, comprising:
one or more sensors configured to detect acoustic signals, wherein the one or more sensors are disposed within a cavity of a blade of a wind turbine;
one or more processors configured to:
receive information associated with the acoustic signals; and
determine whether the blade is damaged or should be inspected based on the information associated with the acoustic signals, wherein the determining includes:
measuring acoustic energy, based on the information associated with the acoustic signals, over a period of time; and
quantifying an amount of erosion to the blades based on the acoustic energy measured over the period of time.

16. The system of claim 15, wherein the determining includes:
comparing the quantified amount of erosion to a threshold; and
determining that the blade is damaged or needs to be inspected based on the comparing.

17. The system of claim 15, wherein the determining includes:
accumulating over time a portion of the measured acoustic energy that represents an erosive effect on the blades;
subtracting a portion of the measured acoustic energy that represents non-erosive operating conditions;
comparing the accumulated portion of the measured acoustic energy that represents the erosive effect to a threshold; and
determining that the blade is damaged or needs to be inspected based on the comparing.

18. The system of claim 15, wherein quantifying the amount of erosion based on the acoustic energy measured over the period of time includes:
measuring an acoustic energy of an impact to the blade by wind, rain, dust, hail, or lightning; and
comparing the measured acoustic energy of the impact to a plurality of different characteristic responses of the blade to an impact by wind, rain, dust, hail, or lightning, where the plurality of different characteristic responses correspond to different levels of health of the blade.

19. The system of claim 15, further comprising:
detecting a plurality of acoustic signals via a plurality of acoustic sensors disposed within cavities of a plurality of blades of the wind turbine;
wherein the determining includes:
measuring a first acoustic energy based on the information associated with a first acoustic signal for a first blade of the plurality of blades;
measuring a second acoustic energy associated with a second acoustic signal for a second blade of the plurality of blades; and
determining a difference between the first acoustic energy and the second acoustic energy.

20. A non-transitory machine-readable storage medium having program instructions that, when executed by one or more processors, cause the one or more processors to perform a method, the method comprising:
receiving information associated with an acoustic signal detected via an acoustic sensor disposed within a cavity of a blade of a wind turbine; and
determining whether the blade is damaged or should be inspected based on the information associated with the acoustic signal, wherein the determining includes:
measuring acoustic energy, based on the information associated with the acoustic signal, over a period of time; and
quantifying an amount of erosion to the blades based on the acoustic energy measured over the period of time.

* * * * *